T. NEW.
Fire and Water Proof Roof.
No. 8,414. Reissued Sept. 10, 1878.
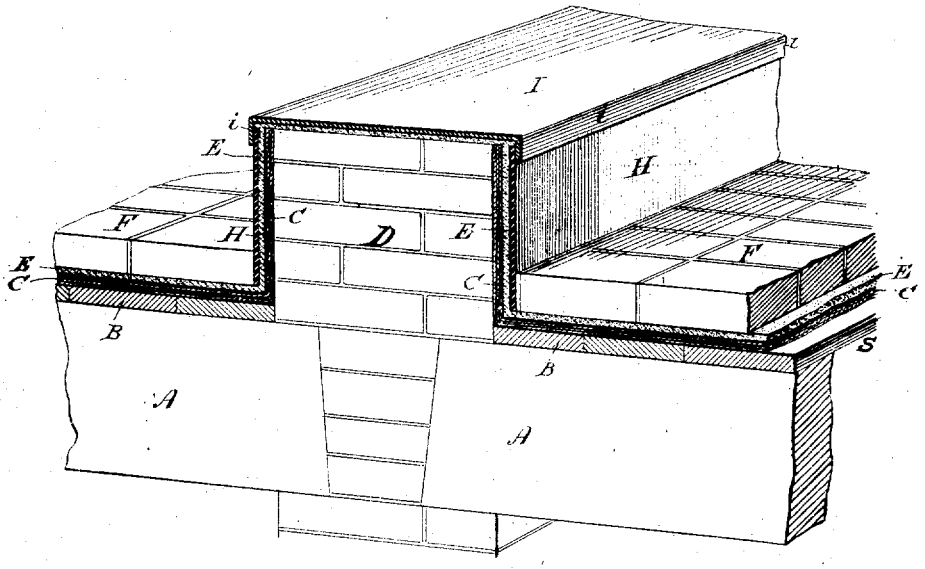
Attest:
C. Clarence Poole
D. A. Lovel
Inventor:
Tobias New
per atty A. H. Evans.

UNITED STATES PATENT OFFICE

TOBIAS NEW, OF NEW YORK, N. Y.

IMPROVEMENT IN FIRE AND WATER PROOF ROOFS.

Specification forming part of Letters Patent No. 147,962, dated February 24, 1874; Reissue No. 8,414, dated September 10, 1878; application filed August 29, 1878.

*To all whom it may concern:*

Be it known that I, TOBIAS NEW, of the city, county, and State of New York, have invented a new and Improved Paved Fire-Proof and Water-Proof Roof; and I do hereby declare the following to be a full, clear, and exact description of the same, reference being had to the accompanying drawings, making a part of this specification, in which the figure is a section of the roof.

The invention relates to means whereby may be constructed a roof that is at the same time water-proof, fire-proof, and adapted to convenient use as a footway and place of resort.

In cities the roof of the main or back building is frequently utilized for drying clothes, paint, or varnish, and for other similar purposes, thus necessitating a frequent treading and trampling thereon. It is also sometimes used for purposes of domestic convenience as a resort; and my invention permits the utilization of the roof in warm weather at evening or when protected from the sun, as one of the most important features of comfortable residence. Most kinds of roofs become deteriorated under this use, develop leak frequently, and require repairs at short intervals.

My invention is substantially described in the following description; but I do not limit myself to the particular description given, as the same may be varied without departing from the spirit of my invention.

I prefer to use, and ordinarily do use, in making and laying a roof according to the principle of my invention, the following materials, in the following manner, viz: The materials employed are the saturated roofing-felt, asphaltic cement, or equivalent water-proof materials, hydraulic-cement mortar, and brick, tile, slate, stone, or metal, or equivalent materials, and I use and lay them preferably as follows:

A represents the roof-beam, with the planks B laid in the ordinary manner, and the saturated roofing-felt C laid on the latter and upward on each side of the battlement D, which is carried up about five courses of brick. This felt is laid preferably in five thicknesses, with intermediate layers of asphaltic cement or equivalent water-proof materials B, but with no cement or composition next to the planking or battlement. The uncovered side of the felt then receives a heavy coat of asphaltic cement or equivalent water-proof materials, the whole forming the water-repellent section of my improved roof, which effectually excludes dampness from the subjacent timbers.

E represents a layer of hydraulic-cement mortar, which forms a partition between the superimposed layer F of hard brick and the cement-covered felt C, and between the cemented felt and the flashing H that holds the wall, and between the upper part of battlement D and coping I.

The flashing H is made preferably of copper, stone, or galvanized metal, and acts as a protection to the mortar E and cemented felt C against the elements, rendering unnecessary the usual flashing of oxidizable metal, while it is itself retained in position by bricks and the coping I, the latter being provided with lips *i* that overlap and bind on it.

The cemented felt C is not stuck to the battlement D and planking B, because of the subsequent shrinkage in the wood, which would thus produce cracks or openings in the water-repellent on wooden-constructed roofs. Upon fire-proof-constructed frame-work the felt would preferably be cemented to the concrete and walls.

I consider the substance and place of the hydraulic-cement mortar to be extremely useful and important, being interposed between the felt and cement below and the hard brick above, thus enabling me to combine with the water-proof features of the felt and cement below the fire-proof quality and pavement above, the mortar forming a layer of an intermediary character, being plastic when applied, so as to be completely adjusted to the felt and cement below, and also to the bricks or equivalent material above, and afterward hardening so as to form a permanent rigid substance, fully protecting the material below and holding in firm place the material above it. This mortar layer thus forms a connecting-link between two bodies of material having wholly different qualities, functions, and uses, the lower material being softer, more yielding, and having the water-proof quality required for a good roof, the upper material being hard, firm, fire-proof, and forming a permanent and desirable pavement and a place of resort. There is thus secured not only a good roof, but virtually an additional story to a residence or building, having some advantages possessed by no other story in the building or by any other contrivance.

I am aware that it is not new to apply saturated roofing-felt and asphaltic cement or equivalent water-proof materials to buildings for roofing purposes; but I apply the same in combination with a superimposed layer of hydraulic-cement mortar, upon which are placed brick, tiles, stone, metal, or other similar material.

I am aware of the Letters Patent issued to Luke S. Mills and Charles Hart Smith, November 3, 1863, and numbered 40,542; but that patent mentions or describes no intermediate layer of hydraulic-cement mortar or equivalent substance, or any intermediate layer of asphaltic cement or equivalent water-proof materials. That patent provides for laying the slate, tile, or other substance directly upon a cement composed of asphalt or coal-tar distilled. The slate, tile, and asphalt are placed together, and the asphaltic cement is allowed to come up between them. This sort of construction has great disadvantages. The slate, tile, &c., draw heat, which keeps the cement in some degree of fusion. The slate, tile, &c., easily become displaced, and the cement is easily worn off and runs off. The cement between the tiles is always more or less sticky in warm weather, when roofs are most used, and an uneven and unserviceable roof is the result.

I do not limit myself, however, to the particular materials or combination hereinbefore described, as I may use any foundation whatever, wood, cement, stone, or metal, or any equivalent material, and of any construction, without departing from the spirit of my invention. I may use saturated felt only, and in one or more thicknesses. I may use asphaltic cement or equivalent or water-proof material only, and I may use them together in any relation whatever to each other or to the composition above described, so that the same is not the substantial layer or bed on which the tile or other material is placed. I may use additional layers of hydraulic-cement mortar or similar material in other relations to the combination than I have described, taking care always to have such layer beneath the tile, brick, &c., as the bed in and on which the same rest.

By my mode of putting together the parts of roof, the planks B, cement-mortar E, bricks F, and flashing H can all settle without opening or damaging the water-repellent B and C at any point. This compensating joint to allow for shrinkage of roof, timbers, and flashing is of great advantage.

A roof constructed according to my invention is not only fire-proof and water-proof and useful as a pavement, but it is cheaper and more durable than roofs of any like efficiency now in public use.

Having thus described my invention, what I claim as new, and desire to secure by Letters Patent, is—

1. The combination, with a planking, B, or equivalent foundation, provided with a water-repellent composed of saturated felt and asphaltic cement, or equivalent water-proof material, of a layer of hydraulic-cement mortar, or equivalent material, and a superimposed layer of brick, tile, slate, stone, or metal, all constructed substantially as above set forth.

2. The flashing H, set in the cement-mortar E, to hold the water-repellent against the battlement, substantially as specified.

3. The combination, with the flashing H, of the coping I, having the lips, as and for the purpose above described.

TOBIAS NEW.

Attest:
R. B. POWELL,
NATHAN DUFF.